(12) United States Patent
Barnard

(10) Patent No.: US 6,263,130 B1
(45) Date of Patent: Jul. 17, 2001

(54) WIDEBAND OPTICAL SERVICE CHANNEL FOR WAVE DIVISION NETWORKS

(75) Inventor: Chris Barnard, Sunnyvale, CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/352,605

(22) Filed: Jul. 13, 1999

(30) Foreign Application Priority Data

Jul. 14, 1998 (GB) .................................................. 9815097

(51) Int. Cl.[7] .............................. G02B 6/28; H04J 14/02
(52) U.S. Cl. ............................ 385/24; 359/119; 359/124
(58) Field of Search .............................. 385/24; 359/124, 359/119, 127, 130

(56) References Cited

U.S. PATENT DOCUMENTS

| | | | | |
|---|---|---|---|---|
| 5,661,585 | * | 8/1997 | Feldman et al. | 359/180 |
| 5,712,932 | * | 1/1998 | Alexander et al. | 385/24 |
| 5,777,764 | * | 7/1998 | Kohn | 359/133 |
| 6,002,503 | * | 12/1999 | Mizrahi | 359/124 |

FOREIGN PATENT DOCUMENTS

| | | |
|---|---|---|
| 0 905 937 A2 | 3/1999 | (EP) . |
| WO 98/36302 | 8/1998 | (WO) . |

\* cited by examiner

*Primary Examiner*—Hemang Sanghavi
*Assistant Examiner*—Omar Rojas

(57) ABSTRACT

A method is described for wavelength-division multiplexed optical fiber networks whereby an unused portion of the optical spectrum is used to transmit OAM&P information internodally. An extra port of one or more of the optical multiplexers and demultiplexers accesses the unused portion of the optical spectrum. The method for the optical service channel avoids the requirement for ancillary filters so that adding and dropping the service channel does not increase the loss experienced in the wavelength-multiplexed signals.

5 Claims, 3 Drawing Sheets

WIDEBAND OPTICAL SERVICE CHANNEL FOR WAVE DIVISION NETWORKS

FIELD OF THE INVENTION

The present invention relates to wave division optical networks and, more particularly, to a wideband optical service channel for such networks.

BACKGROUND OF THE INVENTION

An optical multiplexer is a device that combines several input optical signals, each at a different wavelength (frequency), and each entering the device from separate optical fiber inputs, into one output optical signal on one output optical fiber. Similarly, an optical demultiplexer is a device that separates several input optical signals, each at a different wavelength and entering the device via a single optical fiber, into several optical fiber outputs, one for each wavelength. The same device can be used either as an optical multiplexer or as an optical demultiplexer.

In typical wavelength-division multiplexed (WDM) optical networks, a plurality of signals, each at a separate wavelength, are multiplexed by means of one or more optical multiplexers onto a single optical fiber. After being transmitted over the fiber, the signals are separated by means of an optical demultiplexer and directed to individual receivers. In most point-to-point and star WDM networks, multiplexers are distributed among network nodes.

In WDM networks, one or more optical service channels are employed to convey OAM&P (operation, administration, maintenance and provisioning) information between the network nodes and optical amplifier sites. The optical service channels typically use an optical source at a wavelength that is distinct from the wavelengths of the various signals. The bandwidth or data rate of the service channel is typically smaller than the signal bandwidth or data rate.

Generally, one filter is used to add an optical service channel and another is used to drop the optical service channel. Such an optical service channel implementation is disclosed in U.S. Pat. No. 5,113,459 issued May 12, 1992 to Grasso et al., wherein a wavelength substantially different from the wavelength used for the signals is used for optical service channel transmission. Such an implementation is also shown in U.S. Pat. Nos. 5,291,326 (issued Mar. 1, 1994 to Heidemann) and U.S. Pat. No. 5,532,864 (issued Jul. 2, 1996 to Alexander et al.), where a laser outside of the EDFA (Erbium Doped Fiber Amplifier) band is employed. The purported advantage of such a laser is that the service channel survives an amplifier fault.

Numerous additional systems and methods have been proposed. However, these typically add ancillary components (such as filters), escalate the cost of the system, or compromise bandwidth.

For a particular link, the qualities of the transmitter and receiver may be summarised in a single number, called a "link budget". The link budget represents the amount of allowable attenuation of a signal over the link, say 30 dB. If an ancillary component is included in a link, for instance for service channel transmission, additional attenuation may be introduced. If a component reduces signal power by 1 dB, the link budget would then be 29 dB. The 1 dB reduction in link budget is called a "link budget penalty".

It would be desirable to have a method of transmitting information between nodes in a network using a multiplexer and an optical source where no link budget penalty is realized and where a more economical optical source could be employed.

SUMMARY OF THE INVENTION

The present invention provides a method for transmitting OAM&P (operation, administration, maintenance and provisioning) information between network nodes in a wavelength division multiplex network. OAM&P information is transmitted using a spectrally broad service channel signal transmitted over the unused portion of the optical spectrum.

In accordance with an aspect of the present invention there is provided a method of transmitting information between nodes in a network using a multiplexer and an optical source, the method including providing a plurality of WDM optical signal sources, each at a distinct wavelength and modulated by an independent information source and providing an optical service channel source with a wide optical spectrum which overlaps the optical spectrum of the WDM signal sources. Further, this method includes modulating the optical service channel source with an information source, the information source for conveying network OAM&P information, and providing the following: a wave-division multiplexer having a plurality of input signal ports; means for communication with the WDM signal sources; a service channel input port having means for communicating with the optical service channel source; and a signal output port having means for transmitting multiplexed signals and the service channel over a common optical fiber. This method also includes filtering the WDM signal sources from the multiplexer input signal port to the signal output port, filtering a remaining portion of the optical spectrum from the multiplexer service channel input port to the output port, transmitting the information on the WDM signal sources and the service channel between network nodes over a common optical fiber, providing a wave division demultiplexer having a signal input port and means for receiving the multiplexed signals and the service channel transmitted over the common optical fiber, a plurality of output signal ports having means for communication with the WDM signal receivers, a service channel output port having means for communication with the optical service channel receiver, filtering the WDM signal sources from the input port to the plurality of output WDM signal ports, filtering a remaining portion of the optical spectrum from the input port to the output optical service channel port, providing means for detecting the WDM signal information and detecting the optical service channel OAM&P information.

In accordance with a further aspect of the present invention there is provided a transmission system including a multiplexer including a plurality of filters, one of the filters having an upgrade port, a plurality of input signal ports, each of the said ports connected to one of the filters, a service channel input port, connected to said upgrade port and a signal output port for transmitting the combined output of said filters. The transmission system also includes a transmitting node including a plurality of information transmitters, each of the said transmitters connected to one of the input signal ports and a service channel transmitter connected to said service channel input port. The transmission system also includes a demultiplexer including a signal output port for receiving said combined information and service signal, a plurality of filters, one of the filters having an upgrade port, a plurality of output signal ports, each of said output signal ports connected to one of the filters and a service channel output port connected to said upgrade port. The transmission system also includes a receiving node including a plurality of receivers, each said receiver connected to one said output signal port and a service channel receiver connected to said service channel output port.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Having generally described the invention, reference will now be made to the accompanying drawings illustrating preferred embodiments in which.

Similar numerals employed in the text denote similar elements.

DETAILED DESCRIPTION OF THE PREFERRED EMBODIMENTS

Figure 1:
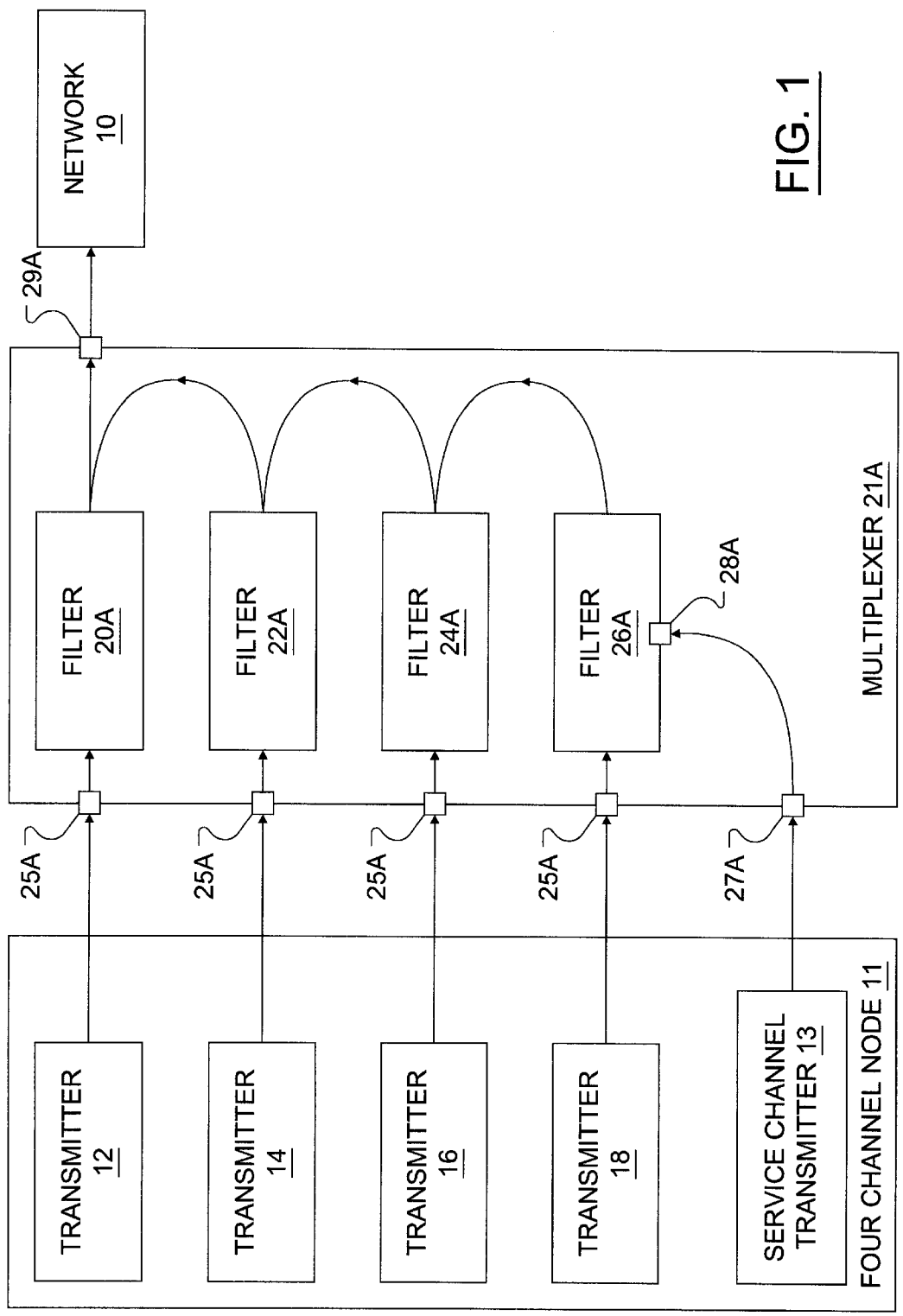
FIG. 1 is a schematic illustration of a cascaded dielectric filter wavelength multiplexer.

FIG. 1 illustrates a four-channel node 11 transmitting a multiplexed optical signal, multiplexed by an add-drop wave division multiplexer 21A, over a network 10. Each signal to be multiplexed originates at one of four transmitters 12, 14, 16 and 18. The output of each transmitter 12, 14, 16 and 18 is multiplexed through the use of a corresponding filter 20A, 22A, 24A, 26A. Each filter 20A, 22A, 24A, 26A, only passes wavelengths in a small frequency band which includes the wavelength of the transmitter to which it is connected. These filters therefore filter out noise. Some WDM filter modules, such as those based on cascaded dielectric filters or those based on Fiber Bragg gratings cascaded with optical circulators, have an "upgrade" port to access the portion of the optical spectrum that is not passed by the information channel filters 20A, 22A, 24A, 26A. In FIG. 1, a service channel transmitter 13 connects to an upgrade port 28A to transmit an OAM&P information signal to multiplexer 21A.

Figure 2:
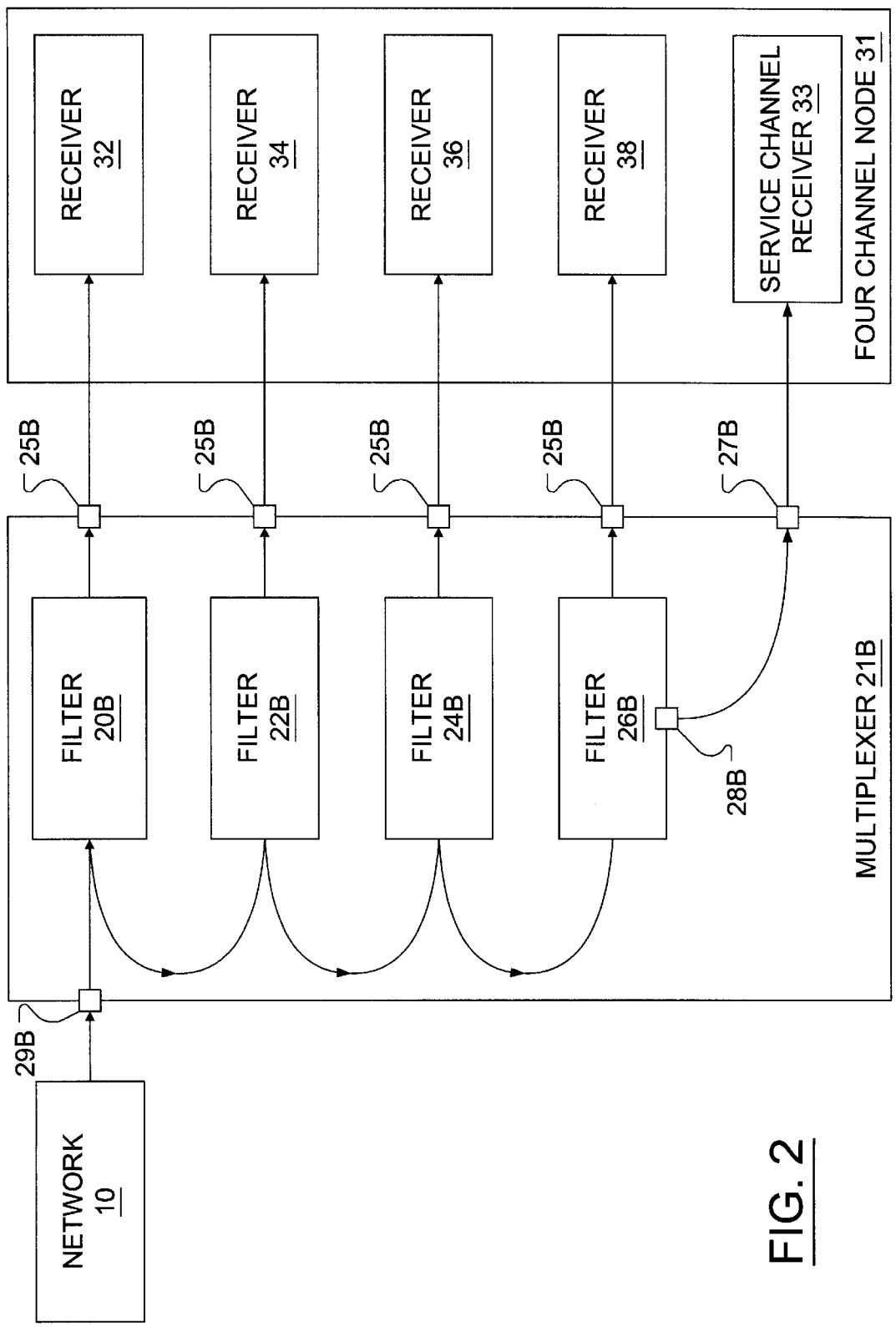
FIG. 2 is a schematic illustration of a cascaded dielectric filter wavelength demultiplexer.

FIG. 2 illustrates a four channel node 31 receiving a plurality of signals, demultiplexed by a wave division multiplexer 21B, from network 10. Multiplexer 21B acts here as a demultiplexer and includes filters 20B, 22B, 24B, 26B which filter the incoming signal and pass a pass band signal to a corresponding receiver 32, 34, 36, 38. A service channel receiver 33 receives an OAM&P information signal from an upgrade port 28B of multiplexer 21B.

Figure 3:
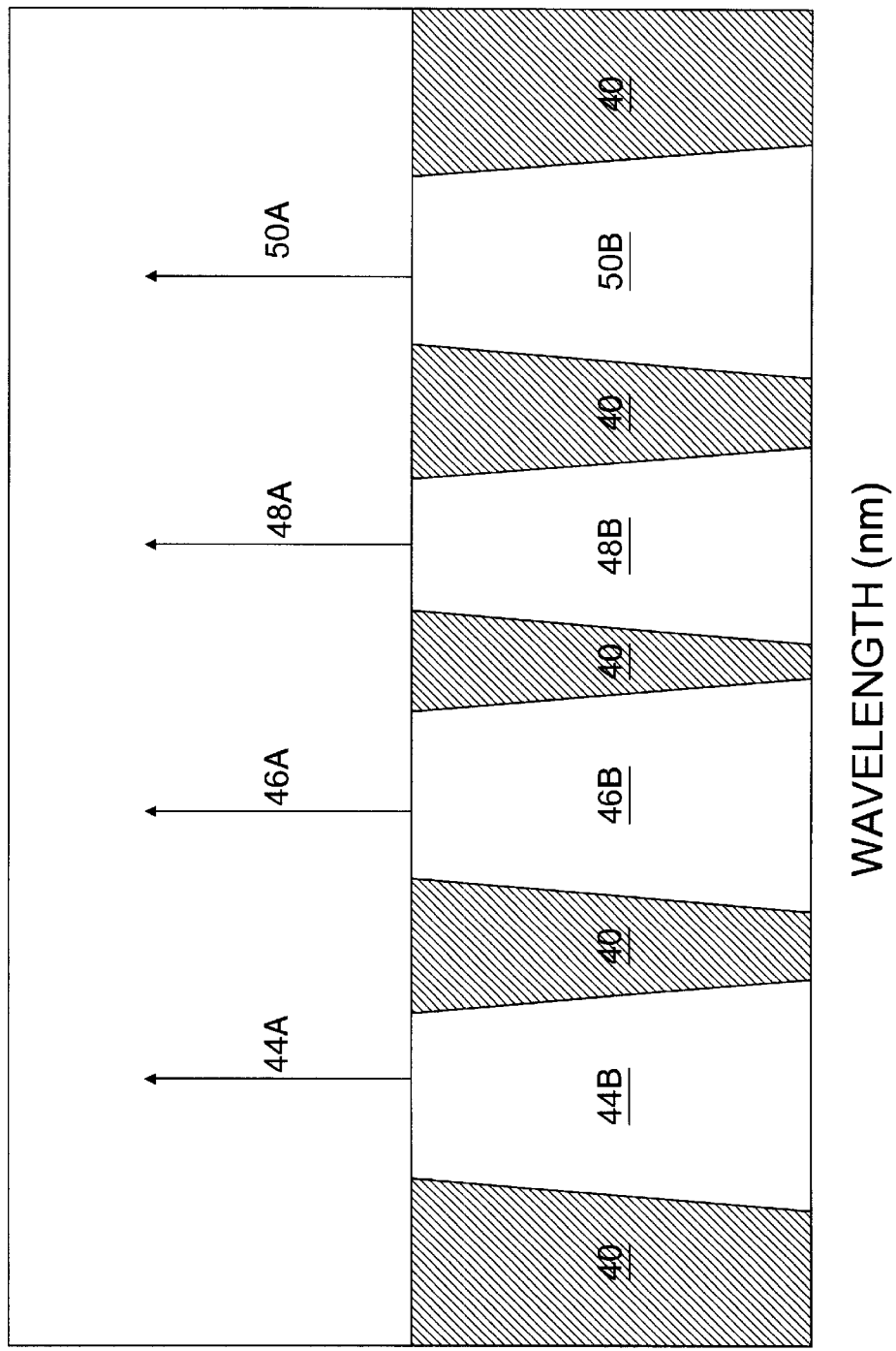
FIG. 3 is a filter spectrum of the cascaded dielectric filter.

A spectrum of this filter arrangement is shown in FIG. 3. Shaded parts 40 show the unused part of the spectrum that is accessible to an upgrade port. A spectrum for each information channel 44A, 46A, 48A, 50A is shown relative to the pass band 44B, 46B, 48B, 50B of their corresponding filters.

In overview, OAM&P information is transmitted between nodes in a network using a wave division multiplexer having an upgrade port. At a transmitting node, an optical signal source, in optical communication with the upgrade port of the multiplexer, carries the service channel for transmitting OAM&P information. The multiplexer combines (filters) the various information channels and the service channel and transmits the result to other network nodes.

Operation at a sending end of a transmission may be described in conjunction with FIG. 1. Transmitters 12, 14, 16, 18 represent a plurality of WDM optical signal sources, each resulting from the modulation of an optical source at a distinct wavelength with an independent information source. Service channel transmitter 13 includes an optical signal source resulting from the amplitude modulation of a service channel optical source with an information source for conveying network OAM&P information. The service channel optical source has a wide optical spectrum, for instance between 64 kilobits per second and 155 megabits per second, which overlaps the optical spectrum of the WDM signal sources. Transmitters 12, 14, 16, 18 transmit to wave-division multiplexer 21A via a plurality of input signal ports 25A. Similarly, service channel transmitter 13 transmits to wave division multiplexer 21A via a service channel input port 27A. The upgrade port filters out any portion of the service channel optical information source which overlaps with the pass bands of filters 20A, 22A, 24A, 26A. This reduces the energy in the service channel optical signal but does not result in the loss of any modulation information because only frequencies are lost and the modulation is amplitude modulation. Wave division multiplexer 21A transmits multiplexed signals to network 10 over a common optical fiber through the use of a signal output port 29A.

Operation at a receiving end of a transmission may be described in conjunction with FIG. 2. A wave division demultiplexer receives a multiplexed signal at a signal input port 29B. The multiplexed signal is then filtered by filters 20B, 22B, 24B, 26B and the pass band signal from each filter is passed to the corresponding receiver 32, 34, 36, 38 via a corresponding output signal port 25B. WDM signal information is then detected at receivers 32, 34, 36, 38. Similarly, a remaining portion of the optical spectrum is filtered out at upgrade port 28B and passed to a service channel output port 27B in communication with service channel receiver 33. At service channel receiver 33 service channel OAM&P information is detected.

The wideband service channel optical source may be a light emitting diode (LED) or super luminescent diode (SLD). Alternatively, a narrow line width source such as a laser can be used for the service channel optical source, if its frequency does not overlap with that of one of the signals. A broadband source is preferred because it costs significantly less than a wavelength controlled laser and the frequency spectrum of a laser is likely to lie on the sharp slope of one of the channel filters. As such, the laser power would fluctuate with any changes in the wavelength of the source matched with that channel filter and with any changes in filter temperature.

A PINFET receiver may be used for receivers 32, 34, 36, 38. A PINFET receiver includes a PIN photo diode and a FET (field-effect transistor) amplifier. The "I" in the "PIN" photo diode indicates that the device is made from "P" and "N" semiconductor layers with a middle intrinsic or insulator layer.

A concern with this method of transmitting service channel information arises with regard to the signal level at the receiving end of a link. However, even when only 5% of a broadband source is transmitted, the relatively low bit rate of the service channel information allows for successful reception. Consider the following example, a ring network wherein the broadband source is filtered such that only the unused optical spectrum within a band is used (about 3 nm). If an LED, used as a broadband source, has spectral width of 60 nanometers, then 5% of its light will be transmitted. If this broadband source has 10 $\mu$W in a single-mode fiber, then −33 dBm will be transmitted. At 1 Mb/s (a preferred bit rate for the optical service channel), receiver sensitivity can be below −70 dBm for a PINFET receiver. As the service channel signal level after the combined effect of the filters and the link (with a typical link budget of 30 dB) exceeds the receiver sensitivity, the incorporation of the LED with the signals requires no change in link budget.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of transmitting information between nodes in a network using a multiplexer and an optical source, comprising:

providing a plurality of WDM optical signal sources, each at a distinct wavelength and modulated by an independent information source;

providing an optical service channel source with a wide optical spectrum which overlaps the optical spectrum of said WDM signal sources;

modulating said optical service channel source with an information source, said information source for conveying network OAM&P information;

providing a wave-division multiplexer having a plurality of input signal ports, means for communication with said WDM signal sources, a service channel input port having means for communicating with said optical service channel source, and a signal output port having means for transmitting multiplexed signals and said service channel over a common optical fiber;

filtering said WDM signal sources from the multiplexer input signal port to said signal output port;

filtering a remaining portion of said optical spectrum from said multiplexer service channel input port to said output port;

transmitting the information on said WDM signal sources and said service channel between network nodes over a common optical fiber;

providing a wave division demultiplexer having a signal input port and means for receiving the multiplexed signals and the service channel transmitted over the common optical fiber, a plurality of output signal ports having means for communication with the WDM signal receivers, a service channel output port having means for communication with the optical service channel receiver;

filtering said WDM signal sources from said input port to said plurality of output WDM signal ports;

filtering a remaining portion of said optical spectrum from said input port to said output optical service channel port;

providing means for detecting said WDM signal information; and detecting the optical service channel OAM&P information.

2. The method as set forth in claim 1, wherein said multiplex filter comprises a four channel filter.

3. The method as set forth in claim 1, wherein said multiplex filter comprises a cascaded dielectric filter.

4. The method as set forth in claim 1, wherein said multiplex filter comprises a series of one or more Fiber Bragg gratings cascaded with optical circulators.

5. A transmission system comprising:

a multiplexer comprising:
a plurality of filters, one of the filters having an upgrade port;
a plurality of input signal ports, each of the said ports connected to one of the filters;
a service channel input port, connected to said upgrade port; and
a signal output port for transmitting the combined output of said filters;

a transmitting node comprising:
a plurality of information transmitters, each of the said transmitters connected to one of the input signal ports; and
a service channel transmitter connected to said service channel input port;

a demultiplexer comprising:
a signal output port for receiving said combined information and service signal;
a plurality of filters, one of the filters having an upgrade port;
a plurality of output signal ports, each of said output signal ports connected to one of the filters; and
a service channel output port connected to said upgrade port;

a receiving node comprising:
a plurality of receivers, each said receiver connected to one said output signal port; and
a service channel receiver connected to said service channel output port.

* * * * *